(12) United States Patent
Napolitano et al.

(10) Patent No.: US 9,101,149 B2
(45) Date of Patent: Aug. 11, 2015

(54) STABLE CREAMER COMPOSITION AND METHOD OF MAKING SAME

(75) Inventors: Guillermo E. Napolitano, Dublin, OH (US); Linda J. Erickson, Dublin, OH (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/111,841

(22) PCT Filed: Apr. 12, 2012

(86) PCT No.: PCT/EP2012/056713
§ 371 (c)(1),
(2), (4) Date: Oct. 15, 2013

(87) PCT Pub. No.: WO2012/140159
PCT Pub. Date: Oct. 18, 2012

(65) Prior Publication Data
US 2014/0037825 A1 Feb. 6, 2014

Related U.S. Application Data

(60) Provisional application No. 61/476,074, filed on Apr. 15, 2011.

(51) Int. Cl.
*A23C 11/04* (2006.01)
*A23C 11/08* (2006.01)

(52) U.S. Cl.
CPC .............. *A23C 11/04* (2013.01); *A23C 11/08* (2013.01)

(58) Field of Classification Search
CPC ........ A23C 11/00; A23C 11/02; A23C 11/04; A23C 11/06; A23C 11/08; A23C 11/10; A23L 1/19; A23L 1/193; A23L 1/196; A23F 5/40
USPC .......................... 426/593, 602, 590, 594, 597
See application file for complete search history.

(56) References Cited

U.S. PATENT DOCUMENTS

| | | | |
|---|---|---|---|
| 6,287,616 B1 * | 9/2001 | Beeson et al. | 426/285 |
| 6,426,110 B1 | 7/2002 | Basa | |
| 2001/0041211 A1 | 11/2001 | Beeson et al. | |
| 2004/0013708 A1 * | 1/2004 | Goulson et al. | 424/439 |
| 2008/0107786 A1 * | 5/2008 | Barnekow et al. | 426/533 |

FOREIGN PATENT DOCUMENTS

| | | | |
|---|---|---|---|
| EP | 0323753 | * | 7/1989 |
| JP | 2009153491 | | 7/2009 |
| WO | 9807329 | | 2/1998 |
| WO | 2011064167 | | 6/2011 |
| WO | 2011065946 | | 6/2011 |

OTHER PUBLICATIONS

Stratas Foods Brochure. Trisun High Oleic Sunflower Oils. 2009. 2 pages.*

* cited by examiner

*Primary Examiner* — Anthony Weier
(74) *Attorney, Agent, or Firm* — K&L Gates LLP

(57) ABSTRACT

The present invention relates to a creamer composition, e.g. for use for addition into a coffee beverage, with improved oxidative and physical stability. The creamer includes oil with a high amount of oleic acids and a limited amount of linoleic acid and linolenic acid. The invention further relates to a method of producing the creamer, a beverage composition including the creamer and a method of producing a beverage composition.

18 Claims, No Drawings

STABLE CREAMER COMPOSITION AND METHOD OF MAKING SAME

CROSS REFERENCE TO RELATED APPLICATIONS

The present application is a National Stage of International Application No. PCT/EP2012/056713, filed Apr. 12, 2012, which claims priority to U.S. Provisional Patent Application No. 61/476,074, filed Apr. 15, 2011, the entire contents of which are being incorporated herein by reference.

FIELD OF THE INVENTION

The present invention relates to creamers that may be used e.g. for adding to coffee, tea, and cocoa beverages, and to methods of producing creamers.

BACKGROUND

Creamers are widely used as whitening agents with hot and cold beverages such as, for example, coffee, cocoa, tea, etc. They are commonly used in place of milk and/or dairy cream. Creamers may come in a variety of different flavors and provide mouthfeel, body, and a smoother texture. Creamers can be in liquid or powder forms. One disadvantage of powder forms is that they do not generally provide an impression of traditional dairy creamers. Another disadvantage of using powder creamers may include difficulties in dissolution when added to coffee, and also the possibility of having a non-homogeneous beverage. Fresh or refrigerated dairy, liquid whiteners usually provide good mouthfeel. However, they are unacceptable for people with dairy intolerance. They are also inconvenient to use due to short shelf life. Moreover, liquid dairy creamers deteriorate rapidly even under refrigeration conditions. A liquid creamer should be shelf-stable during storage without phase separation, creaming, gelation and sedimentation. The creamer should also retain a constant viscosity over time. When added to cold or hot beverages such a coffee or tea, the creamer should dissolve rapidly, provide a good whitening capacity, and remain stable with no feathering and/or sedimentation while providing a superior taste. Emulsions and suspensions are not thermodynamically stable, and there is a real challenge to overcome physico-chemical instability issues in the liquid creamers that contain oil and other insoluble materials, especially for the aseptic liquid creamers during long storage times and at ambient or elevated temperatures temperatures. Moreover, over time, creaming that can still be invisible in the liquid beverages stored at room and elevated temperatures can cause a plug in the bottle when refrigerated. A way to avoid the plug formation would be to use soft, liquid oils instead of hard fats. Oils that remain liquid and do not plug at both ambient and refrigerated temperatures are highly unsaturated and in consequence oxidative unstable. Development of rancid or other off flavours due to oxidation of the fat component is a serious concern for the shelf-life of liquid creamers. Existing solutions include the use of fully or partially hydrogenated oils with a high content of saturated or trans-fatty acids, respectively, and/or the use of artificial antioxidants. The use of hydrogenated oils, however, may be undesirable as a product with hydrogenated oil may be perceived as being less healthy, less natural, and of a lower quality. Unhydrogenated domestic commodity oils (such as soybean, canola and sunflower oils) have a tendency for rapid development of rancidity during storage.

In view of the previous discussion, there are numerous challenges in creating a liquid creamer without hydrogenated oil and with a low content of saturated and trans-fatty acids, which is homogeneous, shelf-stable, and shows good physical and oxidative stability.

SUMMARY OF THE INVENTION

The inventors have found that a creamer comprising an oil with a high proportion of oleic acids and a limited proportion of linoleic acid and linolenic acid shows a surprisingly good physical stability and oxidative stability. Accordingly, the present invention relates to a creamer composition comprising oil, the oil comprising at least 50% oleic acid, no more than 30% linoleic acid, and no more than 5% linolenic acid. In further embodiments, the invention relates to a method of producing a creamer composition of the invention as well as a method of preparing a beverage composition.

DETAILED DESCRIPTION OF THE INVENTION

According to the present invention a creamer composition is provided which has an improved stability, specifically an improved stability towards oxidation of the oil, and/or an improved physical stability. By physical stability is meant improved stability against solid phase separation, plug formation, flocculation and/or aggregation of fat due to fat crystallization and/or formation of an oil rich fraction in the upper part of the composition due to aggregation and/or coalescence of oil droplets, e.g. aggregation and/or coalescence of oil droplets to form a hard "plug" in the upper part of the product. The improved physical stability means that the creamer may be stable without, or with only a minor amount of stabiliser, such as e.g. hydrocolloids.

By a creamer composition is meant a composition that is intended to be added to a food composition, such as e.g. coffee or tea, to impart specific characteristics such as colour (e.g. whitening effect), thickening, flavour, texture, and/or other desired characteristics. A creamer composition of the invention is preferably in liquid form, but may also be in powdered form.

The creamer composition of the invention comprises an oil with a high content of oleic acid. The creamer composition preferably comprises between 2% (weight/weight) and 25% of oil. The oil comprises at least 50% (weight/weight) oleic acid, preferably at least 65% oleic acid. In one embodiment the oil comprises between 50% and 90% oleic acid, preferably between 65% and 85% oleic acid. The oil further comprises no more than 30% (weight/weight) linoleic acid, preferably no more than 10% linoleic acid; and no more than 5% (weight/weight) linolenic acid. The oil preferably comprises no more than 2% (weight/weight) of trans fatty acids, more preferably no more than 1%, even more preferably no more than 0.5% of trans fatty acids. The oil may be derived from any suitable source, preferably the oil is a vegetable oil. The inventors have found that the oxidation stability may be improved if the oil is soy bean oil or canola oil, as compared to e.g. sunflower oil. Accordingly, in a preferred embodiment the oil is soy bean oil and/or canola oil.

The creamer composition of the invention may comprise a hydrocolloid. Hydrocolloids may help to improve physical stability of the composition. Suitable hydrocolloids may e.g. be carrageenan, such as kappa-carragenan, iota-carragenan, and/or lambda-carragenan; starch, e.g. modified starch; cellulose, e.g. microcrystalline cellulose, methyl cellulose, or carboxy-methyl cellulose; agar-agar; gelatine; gellan (e.g., high acyl, low acyl); guar gum; gum Arabic; kojac; locust bean gum; pectin; sodium alginate; maltodextrin; tracaganth; xanthan; or a combination thereof. In a preferred embodiment the creamer composition of the invention comprises carrageenan. The inventors have found that the creamer composition of the invention has an improved physical stability as compared to similar prior art compositions comprising soft (liquid) oils. Therefore, the amount of hydrocolloid needed to obtain a desired stability may be lower than normally used in the art. In a preferred embodiment the creamer composition of the invention comprises between 0.005% (weight/weight) and 1% of hydrocolloid, more preferably between 0.01% and 0.5%.

The creamer composition of the invention may further comprise protein, e.g. between 0.1% (weight/weight) and 5% protein. The protein may be any suitable protein, e.g. milk protein, such as casein, caseinate, and whey protein; vegetable protein, e.g. soy and/or pea protein; and/or combinations thereof. The protein in the composition may work as an emulsifier, provide texture, and/or provide whitening effect.

The creamer composition of the invention may further comprise emulsifiers. The emulsifier may e.g. range from about 0.01% to about 5% by weight. The emulsifier may e.g. be monoglycerides, succinic acid esters of monoglycerides, diacetyl tartaric acid esters of monoglycerides or a combination thereof. In an embodiment, the emulsifier includes a low hydrophilic-lipophilic balance value emulsifier. In another embodiment, the emulsifier includes a medium hydrophilic-lipophilic balance value emulsifier. The hydrophilicity and lipophilicity are different among emulsifiers, and the balance between the two is called the hydrophilic-lipophilic balance HLB value. The HLB value is determined by calculating hydrophilic or lipophilic values of the different regions of the molecule. Various references discuss the HLB value. Examples are Griffin WC: "Classification of Surface-Active Agents by 'HLB,'" Journal of the Society of Cosmetic Chemists 1 (1949): 311, or Griffin WC: "Calculation of HLB Values of Non-Ionic Surfactants," Journal of the Society of Cosmetic Chemists 5 (1954): 259, which are incorporated herein by reference. The HLB value of an emulsifier typically ranges from 0 to 20. Low HLB values range from about 1 to about 5. Medium HLB values range from about 5 to about 10. Low molecular weight emulsifiers with low HLB values can include, but are not limited to, monoglycerides, diglycerides, acetylated monoglycerides, sorbitan trioleate, glycerol dioleate, sorbitan tristearate, propyleneglycol monostearate, glycerol monooleate and monostearate, alone or in combination. The low molecular weight emulsifiers with medium HLB values can include, but are not limited to, sorbitan monooleate, propylene glycol monolaurate, sorbitan monostearate, calcium stearoxyl-2-lactylate, glycerol sorbitan monopalmitate, soy lecithin, canola lecithin, sunflower lecithin, safflower lecithin, and diacetylated tartaric acid esters of monoglycerides, alone or in combination. In an embodiment, the emulsifiers are monoglycerides (MG), diglycerides (DG), diacetyl tartaric acid esters of monoglycerides (DATEM) or a combination thereof having the specified low or medium HLB values. In an embodiment, the weight ratio between MG and DG can be about 7:1 to about 9.5:1, respectively. In another embodiment, the weight ratio between MG and DATEMG can be about 1:2.5 to about 1:4.5, respectively.

The creamer composition of the present invention may further include a buffering agent. The buffering agent can prevent undesired creaming or precipitation of the creamer upon addition into a hot, acidic environment such as coffee. The buffering agent can e.g. be monophosphates, diphosphates, sodium mono- and bicarbonates, potassium mono- and bicarbonates, or a combination thereof. Preferred buffers are salts such as potassium phosphate, dipotassium phosphate, potassium hydrophosphate, sodium bicarbonate, sodium citrate, sodium phosphate, disodium phosphate, sodium hydrophosphate, and sodium tripolyphosphate. The buffer may e.g. be present in an amount of about 0.2 to about 1% by weight of the liquid creamer.

The creamer composition of the present invention may further include one or more additional ingredients such as flavors, sweeteners, colorants, antioxidants (e.g. lipid antioxidants), or a combination thereof. Sweeteners can include, for example, sucrose, fructose, dextrose, maltose, dextrin, levulose, tagatose, galactose, corn syrup solids and other natural or artificial sweeteners. Sugarless sweeteners can include, but are not limited to, sugar alcohols such as maltitol, xylitol, sorbitol, erythritol, mannitol, isomalt, lactitol, hydrogenated starch hydrolysates, and the like, alone or in combination.

Usage level of the flavors, sweeteners and colorants will vary greatly and will depend on such factors as potency of the sweetener, desired sweetness of the product, level and type of flavor used and cost considerations. Combinations of sugar and/or sugarless sweeteners may be used. In one embodiment, a sweetener is present in the creamer composition of the invention at a concentration ranging from about 20% to about 50% by weight. In another embodiment, the sweetener concentration ranges from about 25% to about 35% by weight.

The invention further relates to a method of producing a creamer composition of the invention. The method comprises providing a composition, the composition comprising an oil as disclosed above, water, and optionally additional ingredients as disclosed herein; and homogenising the composition to produce an oil-in-water emulsion. Thus in one embodiment, the method comprises a) providing a composition comprising water and oil, the oil comprising at least 50% oleic acid, no more than 30% linoleic acid, and no more than 5% linolenic acid; and b) homogenising the composition to produce an oil-in-water emulsion. Before homogenisation, optional compounds such as hydrocolloids, emulsifiers, proteins, buffers, sweeteners and/or flavors may be hydrated in water (e.g., at between 40° C. and 90° C.) under agitation with the addition of the melted oil. The method may further comprise heat treating the composition before, e.g. by aseptic heat treatment. Aseptic heat treatment may e.g. use direct or indirect UHT processes. UHT processes are known in the art. Examples of UHT processes include UHT sterilization and UHT pasteurization. Direct heat treatment can be performed by injecting steam into the emulsion. In this case, it may be necessary to remove excess water, for example, by flashing. Indirect heat treatment can be performed with a heat transfer interface in contact with the emulsion. The homogenization may be performed before and/or after heat treatment. It may be interesting to perform homogenization before heat treatment in order to improve heat transfers in the emulsion, and thus achieve an improved heat treatment. Performing a homogenization after heat treatment usually ensures that the oil droplets in the emulsion have the desired dimension. After heat treatment the product may be filled into any suitable packaging, e.g. by aseptic filling. Aseptic filling is described in various publications, such as articles by L, Grimm in "Beverage Aseptic Cold Filling" (Fruit Processing, July 1998, p. 262-265), by R. Nicolas in "Aseptic Filling of UHT Dairy Products in HDPE Bottles" (Food Tech. Europe, March/April 1995, p. 52-58) or in U.S. Pat. No. 6,536,188 to Taggart, which are incorporated herein by reference. In an embodiment, the method comprises heat treating the liquid creamer before filling the container. The method can also comprise adding a buffering agent in amount ranging from about 0.1% to about 1.0% by weight to the liquid creamer before homogenizing the liquid creamer. The buffering agent can be one or more of sodium mono-and di-phosphates, potassium mono- and di-phosphates, sodium mono- and bi-carbonates, potassium mono- and bi-carbonates or a combination thereof.

The creamer, when added to a beverage, produces a physically stable, homogeneous, whitened drink with a good mouthfeel, and body, smooth texture, and a pleasant taste with no off-flavors notes. The use of the creamer of the invention is not limited for only coffee applications. For example, the creamer can be also used for other beverages, such as tea or cocoa, or used with cereals or berries, as a creamer for soups, and in many cooking applications, etc. A liquid creamer of the invention is preferably physically and oxidative stable and overcome phase separation issues (e.g., creaming, plug formation, gelation, syneresis, sedimentation, etc.) during storage at refrigeration temperatures (e.g., ~4° C.), room temperatures (e.g., ~20° C.) and elevated temperatures (e.g., ~30 to 38° C.). The stable liquid creamers can have a shelf-life stability, for example, for at least 9 months, such as at least 6 months at 4° C. and/or at 20° C., 6 months at 30° C., and 1 month at 38° C.

The invention in an even further aspect relates to a beverage composition comprising a creamer composition as disclosed above. A beverage composition may e.g. be a coffee, tea, malt, cereal or cocoa beverage. A beverage composition may be liquid or in powder form. Accordingly, the invention relates to a beverage composition comprising a) a creamer composition of the invention, and b) a coffee, tea, malt, cereal, or cocoa product, e.g. an extract of coffee, tea, malt, or cocoa. If the beverage composition is in liquid form it may e.g. be packaged in cans, glass bottles, plastic bottles, or any other suitable packaging. The beverage composition may be aseptically packaged. The beverage composition may be produced by a method comprising a) providing a beverage composition base; and b) adding a creamer composition according to the invention to the beverage composition base. By a beverage composition base is understood a composition useful for producing a beverage by addition of a creamer of the invention. A beverage composition base may in itself be suitable for consumption as a beverage. A beverage composition base may e.g. be an extract of coffee, tea, malt, or cocoa.

EXAMPLES

Example 1

A creamer composition was prepared from the following ingredients:

| Ingredient | % (weight/weight) |
|---|---|
| Water | 80.000 |
| Sweetener (Corn syrup DE 24) | 11.860 |
| Oil | 6.800 |
| Buffer salts (Di-potassium phosphate) | 0.400 |
| Low molecular weight emulsifiers | 0.400 |

-continued

| Ingredient | % (weight/weight) |
|---|---|
| Hydrocolloid (carrageenan) | 0.015 |
| Protein (Sodium caseinate) | 0.500 |
| flavor and color | 0.02 |

The oil used was a GMO (derived from a Genetically Modified Organism) soy bean oil with the following composition:

| Fatty acid | % (weight/weight) |
|---|---|
| C 16:0 | 6.40 |
| C 18:0 | 3.95 |
| C 18:1 n-9 (oleic acid) | 76.21 |
| C 18:2 n-6 (linoleic acid) | 8.24 |
| C 18:3 n-3 (alpha-linolenic acid) | 2.04 |

All ingredients were added to water at 68° C. and mixed thoroughly, and additional water was added to achieve the final composition given above. The composition was heated to 80° C. and homogenised in a two-stage homogeniser operating at 2500 and 500 psi. The homogenised composition was UHT treated at 144° C. for 3 seconds, and aseptically filled into PET bottles.

The oxidation stability of the oil used for production of the creamer above was assessed by an accelerated test at 120° C. using a Rancimat apparatus commonly refered as OSI (Oxidation Stability Index). In the Rancimat method, a stream of air is blown through the sample at a temperature between 100 and 120° C. This results in the oxidation of unsaturated fatty acids. Some of the final products of this accelerated oxidation process are low molecular weight, water soluble organic acids, such as formic and acetic acids. These are transferred by the air flow into a measuring tube containing deionized water, whose conductivity is continually being measured. Plotting conductivity against time, produces oxidation curves, whose point of inflection is known as the induction time, typically reported in hours. The longer the induction time, the more oxidative stable the oil is.

The rancidity of the oil in the finished product was evaluated in sensory tests by trained panelists as described in example 1. The scores are summarized in the table below.

|  | 0 | 3 weeks | 2 months | 3 months | 5 months | 6 months | 7 months |
|---|---|---|---|---|---|---|---|
| Refrigerated storage | 7.00 | 7.00 | 7.00 | 7.50 | 6.25 | 7 | 7.5 |
| Ambient storage |  | 7.00 | 6.50 | 7.00 | 7.75 | 6.75 | 7.5 |

The sensory quality scale is as follows:
9-10—The sample is virtually identical to the reference.
6-8—The sample meets the definition for the product. Any possible differences from the reference are still acceptable.
3-5—The sample does not meet the standard definition for the product. Significant differences between the reference and the sample would be noted. The product is unacceptable
1-2—The sample has obvious defects or differences from the reference. The product is unacceptable

Example 2

A creamer composition was prepared from the following ingredients:

| Ingredient | % (weight/weight) |
| --- | --- |
| Water | 80.000 |
| Sweetener (Corn syrup DE 24) | 11.860 |
| Oil (HO Canola, oleic acid 70-75%) | 6.800 |
| Buffer salts (Di-potassium phosphate) | 0.400 |
| Low molecular weight emulsifiers | 0.400 |
| Hydrocolloid (carrageenan) | 0.015 |
| Protein (Sodium caseinate) | 0.500 |
| flavor and color | 0.02 |

The oil used was a GMO canola oil with the following composition:

| Fatty acid | % (weight/weight) |
| --- | --- |
| C 16:0 | 3.8 |
| C 18:0 | 2.0 |
| C 18:1 n-9 (oleic acid) | 75 |
| C 18:2 n-6 (linoleic acid) | 15 |
| C 18:3 n-3 (alpha-linolenic acid) | 2.0 |

The rancidity of the oil in the finished product was evaluated in sensory tests by trained panelists as described in example 1. The scores are summarized in the table below.

| | 0 | 3 weeks | 2 months | 3 months | 4 months | 5 months | 6 months | 7 months |
| --- | --- | --- | --- | --- | --- | --- | --- | --- |
| Refrigerated storage | 7.00 | 7.25 | 6.75 | 7.50 | 7.0 | 8.25 | 8.00 | 7.5 |

Example 3

A creamer composition was prepared from the following ingredients:

| Ingredient | % (weight/weight) |
| --- | --- |
| Water | 80.000 |
| Sweetener (Corn syrup DE 24) | 11.860 |
| Oil (HO Canola, oleic acid 80-85%) | 6.800 |
| Buffer salts (Di-potassium phosphate) | 0.400 |
| Low molecular weight emulsifiers | 0.400 |
| Hydrocolloid (carrageenan) | 0.015 |
| Protein (Sodium caseinate) | 0.500 |
| flavor and color | 0.02 |

The oil used was a GMO canola oil with the following composition:

| Fatty acid | % (weight/weight) |
| --- | --- |
| C 16:0 | 3.1 |
| C 18:0 | 2.1 |
| C 18:1 n-9 (oleic acid) | 80.0 |
| C 18:2 n-6 (linoleic acid) | 8.8 |
| C 18:3 n-3 (alpha-linolenic acid) | 2.2 |

The rancidity of the oil in the finished product was evaluated in sensory tests by trained panelists as described in example 1. The scores are summarized in the table below.

| | 0 | 3 weeks | 2 months | 3 months | 4 months | 5 months |
| --- | --- | --- | --- | --- | --- | --- |
| Refrigerated storage | | 6.75 | 7.25 | 7.5 | 7 | 8.5 |

The invention claimed is:

1. A liquid creamer composition consisting of:
   water, sweetener, buffer salts, protein, flavor and color;
   a high oleic acid oil (i) comprising at least 50% oleic acid, no more than 30% linoleic acid, and no more than 5% linolenic acid, (ii) selected from the group consisting of soy bean oil, canola oil, and combinations thereof;
   a hydrocolloid in an amount between 0.01% and 0.5% of the liquid creamer composition; and
   an emulsifier.

2. The liquid creamer composition of claim 1, wherein the hydrocolloid is carrageenan.

3. The liquid creamer composition of claim 1, wherein the amount of the high oleic acid oil is between 2% and 25% of the liquid creamer composition.

4. The liquid creamer composition of claim 1 comprising 0.1% to 5% of the protein, 2% to 25% of the high oleic acid oil, 0.01% to 5% of the emulsifier, and 0.2% to 1% of the buffer salts.

5. The liquid creamer composition of claim 1, wherein the high oleic acid oil comprises at least 65% oleic acid.

6. The liquid creamer composition of claim 1, wherein the high oleic acid oil comprises no more than 10% linoleic acid.

7. The liquid creamer composition of claim 1, wherein the high oleic acid oil comprises less than 2% trans fatty acid.

8. A beverage composition comprising:
   a liquid creamer composition consisting of:
      water, sweetener, buffer salts, protein, flavor and color;
      a high oleic acid oil (i) comprising at least 50% oleic acid, no more than 30% linoleic acid, and no more than 5% linolenic acid, (ii) selected from the group consisting of soy bean oil, canola oil, and combinations thereof;
      a hydrocolloid in an amount between 0.01% and 0.5% of the liquid creamer composition; and
      an emulsifier.

9. The beverage composition of claim 8, wherein the beverage composition is selected from the group consisting of a coffee, tea, malt, cereal, and cocoa beverage composition.

10. A method of producing a liquid creamer composition, the method comprising:
    providing a composition consisting of water, sweetener, buffer salts, protein, flavor, color, a high oleic acid oil, a hydrocolloid in a range between 0.01% and 0.5% of the composition, and an emulsifier, the high oleic acid oil (i) comprising at least 50% oleic acid, no more than 30% linoleic acid, and no more than 5% linolenic acid, and (ii) selected from the group consisting of soy bean oil, canola oil, and combinations thereof; and homogenising the composition to produce an oil-in-water emulsion.

11. A method of preparing a beverage composition, the method comprising:
providing a beverage composition base; and
adding a liquid creamer composition to the beverage composition base, the liquid creamer composition consisting of water, sweetener, buffer salts, protein, flavor, color, a high oleic acid oil, a hydrocolloid in a range between 0.01% to 0.5% of the liquid creamer composition, and an emulsifier, the high oleic acid oil (i) comprising at least 50% oleic acid, no more than 30% linoleic acid, and no more than 5% linolenic acid, and (ii) selected from the group consisting of soy bean oil, canola oil, and combinations thereof.

12. The method of claim 11, wherein the beverage composition is selected from the group consisting of a coffee, tea, malt, cereal, and cocoa beverage.

13. The method of claim 10 further comprising aseptically filling the oil-in-water emulsion into a package.

14. The liquid creamer composition of claim 1, wherein the emulsifier is 0.01% to 5% of the liquid creamer composition.

15. The liquid creamer composition of claim 1, wherein the emulsifier is selected from the group consisting of monoglycerides, diglycerides, acetylated monoglycerides, sorbitan trioleate, glycerol dioleate, sorbitan tristearate, propyleneglycol monostearate, glycerol monooleate, glycerol monostearate, sorbitan monooleate, propylene glycol monolaurate, sorbitan monostearate, calcium stearoxyl-2-lactylate, glycerol sorbitan monopalmitate, soy lecithin, canola lecithin, sunflower lecithin, safflower lecithin, diacetylated tartaric acid esters of monoglycerides, and combinations thereof.

16. The liquid creamer composition of claim 1, wherein the emulsifier is selected from the group consisting of monoglycerides, diglycerides, diacetyl tartaric acid esters of monoglycerides, and combinations thereof.

17. The liquid creamer composition of claim 16, wherein the emulsifier comprises monoglycerides (MG) and diglycerides in a MG:DG weight ratio of 7:1 to 9.5:1.

18. The liquid creamer composition of claim 16, wherein the emulsifier comprises monoglycerides (MG) and diacetyl tartaric acid esters of monoglycerides (DATEMG) in a MG:DATEMG weight ratio of 1:2.5 to 1:4.5.

* * * * *